Dec. 11, 1951 W. F. KLEIN 2,577,897
AIR BRAKE WITH ANTISLIDE CONTROL
Filed April 9, 1947 2 SHEETS—SHEET 1
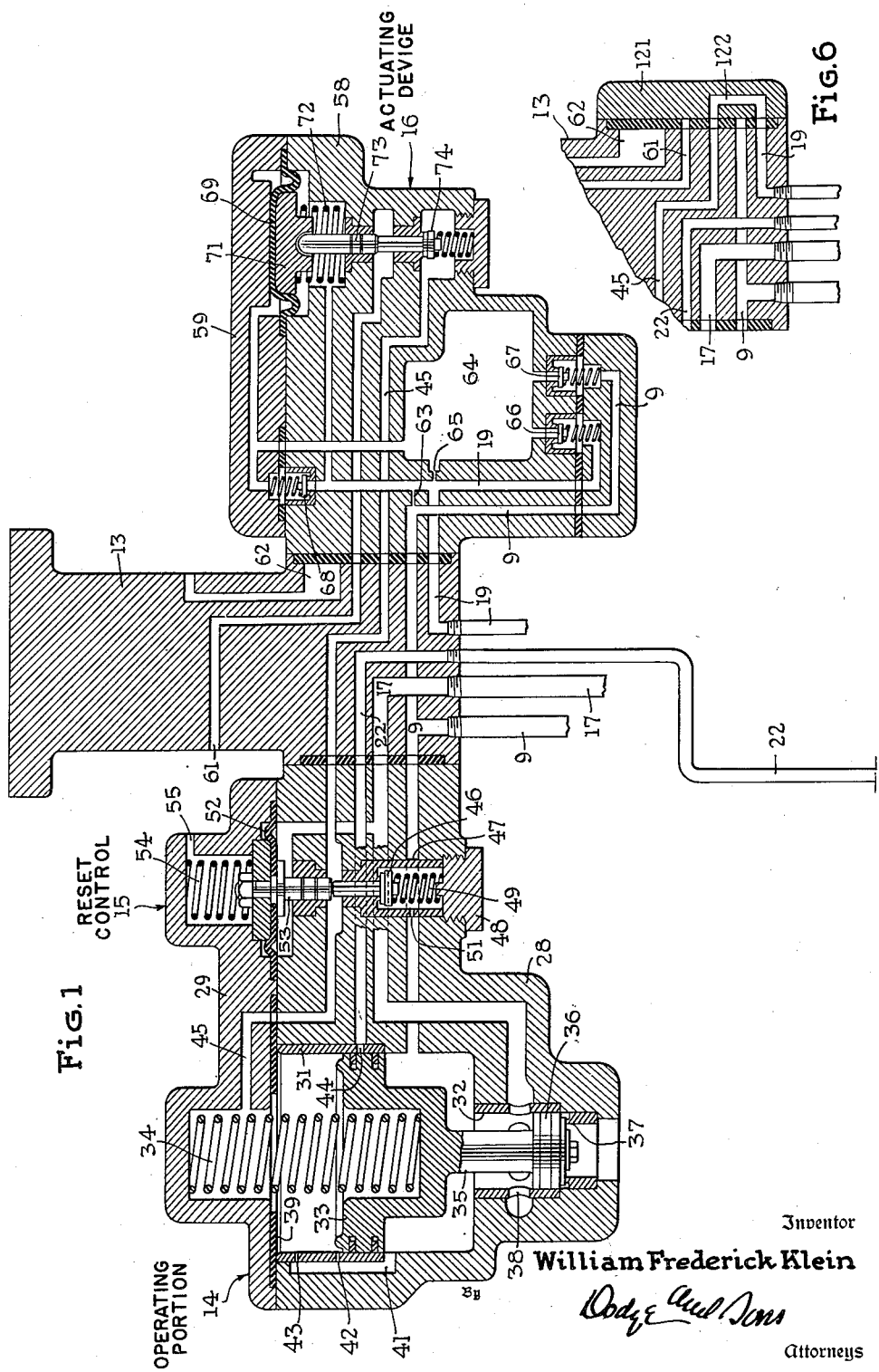
Inventor
William Frederick Klein
Dodge and Sons
Attorneys Dec. 11, 1951 W. F. KLEIN 2,577,897
AIR BRAKE WITH ANTISLIDE CONTROL
Filed April 9, 1947 2 SHEETS—SHEET 2
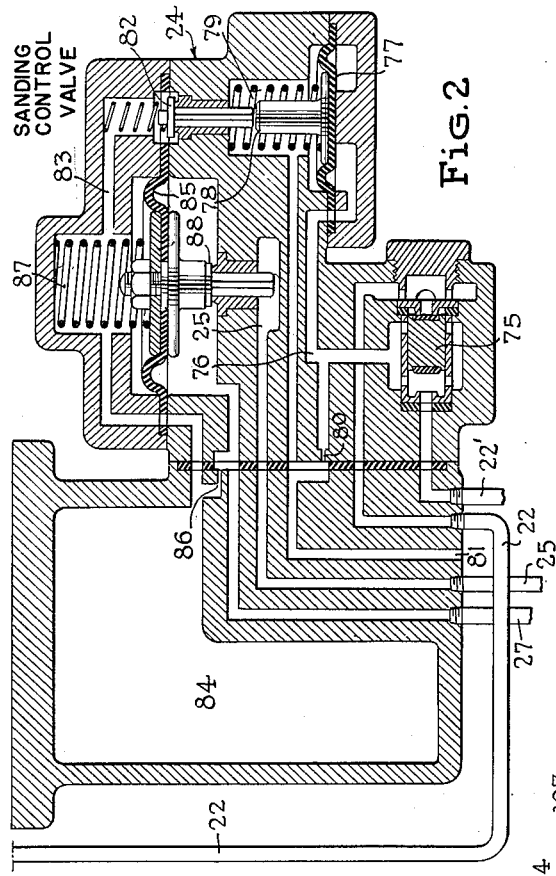
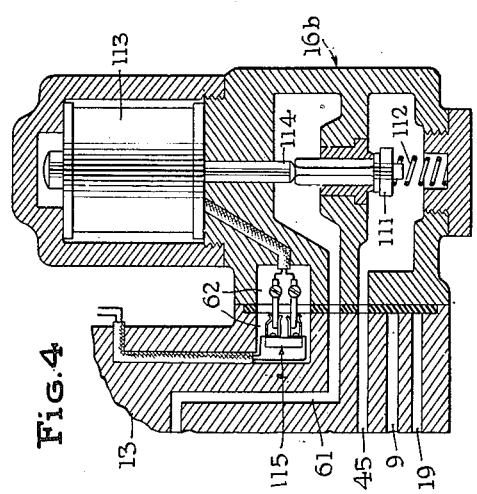
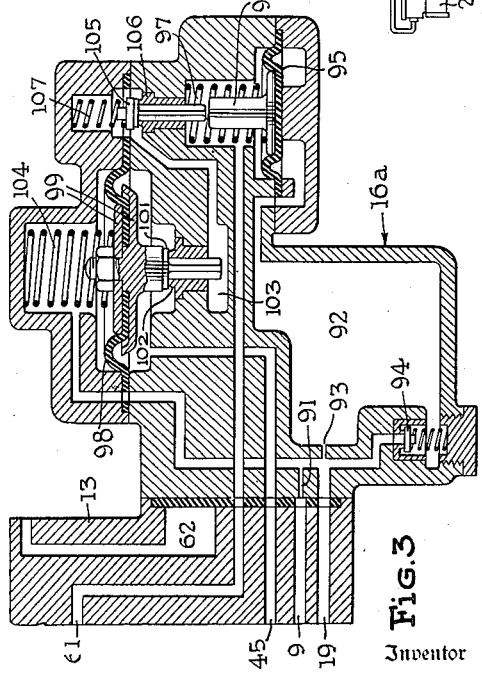
Inventor
William Frederick Klein
By Dodge and Sons
Attorneys Patented Dec. 11, 1951

2,577,897

UNITED STATES PATENT OFFICE 2,577,897

AIR BRAKE WITH ANTISLIDE CONTROL

William F. Klein, Watertown, N. Y., assignor to The New York Air Brake Company, a corporation of New Jersey Application April 9, 1947, Serial No. 740,503

8 Claims. (Cl. 303—21)

This invention relates to air brakes and particularly to the coordination of a sander mechanism with an anti-slide mechanism.

The demand for high passenger train speeds and the requirements imposed upon stopping distances have compelled the brake manufacturers to adopt high braking ratios. As a consequence, the risk of sliding wheels is greatly increased. This has led to efforts to use devices known as anti-sliders. A controlling decelerometer functions during a brake application to sense slipping of the wheel on the rail which always preceeds sliding of the wheel. Controlling decelerometers used in the air brake art commonly take the form of inertia or other devices each driven by a pair of car wheels. Their indications may be transmitted either pneumatically or electrically, and commercial controlling decelerometers of each type are available. In the present specification the term "decelerometer" will be used to indicate controlling decelerometers, of one of the types just mentioned.

The present invention supplies a device which will respond to the slip indication of a decelerometer, release the brakes from the wheels which are slipping and then permit the brakes to reapply. The concept as thus broadly stated, is not new but past embodiments have been unsatisfactory in several respects. Each release and reapplication increases stopping distance as compared with normal operation, so that it is important that the duration of temporary release be reduced to the practicable minimum. It is also important that the device use a minimum quantity of air, and that it be so contrived that the brakes can never reapply until they have released sufficiently and for a long enough period to assure that the wheels are again rotating normally.

The invention proposes a valve having an operating portion which, when activated by the decelerometer, instantly initiates the venting action, and a reset-control portion which will inhibit reapplication until the brakes have released to a definite degree.

The invention solves the difficult problem of using this type of control, regardless of the intensity of the brake application and regardless of speed of application. Thus, it has similar characteristics under service application and under emergency application conditions.

Another feature of the invention is a sander-control so related to the anti-slider that after the anti-slider operates to release the brakes, sanding will commence. An important characteristic is that sanding cannot be initiated until it is assured that the anti-slider will positively release the brakes, and will be started before the reset-control valve permits a reapplication. From this it follows that sanding can never commence while a wheel is sliding on the rail. If this should occur, the damage to wheels caused by sliding would be greatly increased.

The invention also allows the use of separate anti-sliders which protect different brakes or groups of brakes on the same vehicle. For example, there can be two independent anti-sliders, one for each truck of a car, and in addition these two independent anti-sliders can selectively exercise control over a single sander control valve, so that duplication of the anti-sliders does not entail duplication of sanding control valves. This is not to say that such duplication may not be adopted if desired. The point is that duplication is rendered unnecessary.

Preferred embodiments of the invention are illustrated in the accompanying drawings in which:

Figure 1 is a diagrammatic section through the pipe bracket with an anti-slide control valve mechanism. The left hand unit comprises the operating portion which releases the brakes and causes them to reapply and the reset-control portion which inhibits reapplication until substantially complete release has occurred. The unit to the right of the bracket is an actuator of a type which responds to the indications of a pneumatic decelerometer;

Figure 2 is a diagrammatic section of a timed sanding-valve such as may be controlled by the mechanism shown in Figure 1. (NOTE.—Figures 1 and 2, when assembled one above the other afford a complete diagram of the brake releasing and sanding valve mechanism.)

Figure 3 is a fragmentary diagrammatic section showing the substitution in the assembly of Fig. 1 of a modified form of an actuator, also responsive to indications of a pneumatic decelerometer;

Figure 4 is a fragmentary diagrammatic section indicating the substitution in the assembly of Fig. 1 of an actuator which will respond to the indications of an electrical decelerometer;

Figure 5 is a diagrammatic view indicating the connections used on a typical passenger car installation; and Figure 6 suggests the possibility of substituting a blanking plate for the actuating device of Figs. 1 and 3 when certain protective effects are not needed.

Refer first to Figure 5. In this figure, 6 represents a brake controlling valve device, for example, a D-22 control valve, which in response to changes of pressure in the brake pipe establishes corresponding pressures in the pipe 7. Pipe 7 leads to a relay 8 and the relay 8 acts to establish and to maintain in the pipe 9 a pressure which is a function of the pressure existing in the pipe 7. The relay 8 is supplied with air from a supply reservoir (not shown) through the connection 11.

The parts so far described will be recognized as a known passenger car brake installation. The relay 8 typifies any valve which will function to maintain a definite pressure in the pipe 9, regardless of leakage. Such a relay is the device which would ordinarily be used commercially but persons skilled in the art will readily understand that a self-lapping brake valve or the application portion of a distributing valve perform similar functions.

The installation shown in Figure 5 is that for a car having two trucks, each having a brake cylinder. The respective trucks are typified in the figure each by a wheel 12. There is an anti-slider device for each truck and consequently there are two pipe brackets 13, each of which sustains an operating portion generally indicated by the numeral 14, a reset-control portion generally indicated by the numeral 15 and an actuating device generally indicated by the numeral 16.

All pipe connections are made to the pipe brackets 13 and are for each bracket as follows; the relay-controlled pipe 9; a pipe 17 which leads to the corresponding brake cylinder 18; a pipe 19 which leads to and at times is vented by the corresponding decelerometer 21, there being a decelerometer associated with each of the two wheels 12. Further, there are pipes 22 and 22' which are functionally identical but lead from respective pipe brackets 13 to the timed sanding valve, generally indicated at 24. The timed sanding valve is connected by a branched pipe 25 with sanding units on each truck. These are typified by sanders 26 which are shown as arranged to sand ahead of respective wheels 12. Sanding air is supplied to the sanding control valve 24 by connection 27 which leads from a sanding supply reservoir, not shown.

The description of Figure 5 will facilitate the identification of connections in the other figures. To simplify description, ports in the other figures which are mere continuations of pipes identified in Fig. 5, and in free communication therewith, are identified by the reference numeral which identifies the pipe.

Refer to Figure 1. The operating portion 14 and the reset-control portion 15 are enclosed in a body 28 with removable cap 29 which is common to both portions. In the operating portion there is a cylinder bushing 31 and a valve seat bushing 32 which are coaxial. A relatively large piston 33 works in the bushing 31 and is biased downward by a light coil compression spring 34. The spring and piston are so coordinated that the piston will shift in response to a pressure differential of about 6 p. s. i. Extending downward from the piston 33 is a stem 35 which ends in a piston valve 36. The valve 36 works in the valve bushing 32. In its lowermost position it seals against a seat 37 surrounding an atmospheric exhaust port. When the valve 36 seals against the seat 37, it is wholly below a series of radial ports 38, formed in the bushing 32 and communicating with a passage leading to the brake cylinder pipe 17. When the piston 33 moves to its uppermost position, it seals against a gasket 39 which also seals the cap 29 to the body 28. At that time the piston valve 36 is wholly above the ports 38 so that pipe and passage 17 are vented freely to atmosphere. For lack of a better term the piston valve 36 will be called an "intercepting" valve.

The space below the piston 33 is connected to the pipe 9, and during a brake application, is maintained under pressure by the relay 8. It follows that when the piston 33 is in its lowermost position, the relay-controlled pipe 9 is connected to the brake cylinder pipe 17, so that the brakes can be applied and released in a normal manner. When the piston 33 is in its uppermost position, ports 38 are disconnected from the space below the piston 33 and are connected to atmosphere, so that brake cylinder is freed from control by relay 8 and is rapidly vented to atmosphere.

A passage 41 leads from the space below the piston 33 behind bushing 31 and communicates with a relatively large lower port 42 and with a smaller upper port 43, both drilled through the bushing 31. Port 42 is exposed by the piston when the latter is in its lowermost position. It is blanked by the piston as soon as this starts to move upward. The port 43 is blanked by the piston just before the piston reaches its uppermost position.

A third port 44 is drilled through bushing 31 in such a position that it is blanked by the piston 33 when the latter is in its lowermost position and is connected with the space below the piston when the latter is in its uppermost position. This port leads to passage and pipe 22 which, it will be remembered, leads to the sanding control valve 24. It follows that when the piston 33 is in its uppermost position, the relay valve 8 supplies air through the pipe 9, port 44 and connection 22 to the sanding control valve.

The space above the piston 33 is in free communication with the passage 45 which leads through the body 28 and the bracket 13 and is the passage through which the operating portion is controlled.

The reset-control portion comprises a pressure controlled valve which responds to pressure in the brake cylinder passage 17 and opens when pressure in this passage is atmospheric or only slightly above atmospheric, say 6 p. s. i. When this pressure control valve opens, it admits air from the passage 9 to the passage 45 and causes piston 33 to reset, i. e., move to its lowermost position. The operating portion 14 is put into brake releasing position by venting of passage 45 and is restored to normal position by recharge of passage 45 effected by the pressure controlled valve just mentioned. The reset-control valve is a poppet valve 46 which is mounted in the combined bushing and seat 47 and retained by plug 48. The valve opens downward and is held seated by coil compression spring 49. A drilled port 51 in the bushing 47 determines the rate of flow through the valve when the valve is open. When the valve is open, flow can occur through the port 51, past the valve 46 to passage 45 and thence to the space above piston 33.

A branch of brake cylinder passage 17 leads to a space below a flexible diaphragm 52. The margin of this diaphragm is clamped between the body 28 and a portion of the cap 29. Attached to the center of diaphragm 52, by the usual thrust plates, clearly shown in the drawing, is a stem 53. The diaphragm and stem are biased downward by a coil compression spring 54. The space above the diaphragm is vented to atmosphere at 55. The lower end of the stem 53 is in thrust relation with the pilot of valve 46. The spring 54 is of such a strength that it will overpower the valve spring 49 and hold the valve 46 open provided brake cylinder pressure is below some chosen value, here assumed to be 6 p. s. i. Whatever value is chosen is so low that the brake will be released.

The valve 46 controls the restoration of the brake application after its release by the operating portion. One function of the reset-control mechanism is to delay reset until brake pressure has dropped to an absolutely safe value. Another is to initiate reapplication instantly when a safe brake cylinder pressure has been reached.

The actuating mechanism 16 controls the operating portion by momentarily venting passage 45, and is mounted on the right side of the pipe bracket 13 in Figure 1. There is a body 58 with a cap 59 sealed on a mounting face on the bracket. On this mounting face terminate ports communicating with the pipes 19 and 9, port 45 and an atmospheric exhaust port 61. There is also a large cavity indicated at 62 which has no function where the decelerometer is of the pneumatic type, but is available for certain electrical connections which will later be described. Cavity 62 is blanked by the mounting gasket.

The actuating portion 16 functions to connect port 45 and consequently the space above piston 33 to atmosphere for a brief period, in response to venting flow at the related decelerometer, it being understood that the decelerometer is of a known type which opens a vent valve if its related wheel starts to slip.

The relay passage 9 is connected through a choke port 63 with the decelerometer passage 19. The passage 19 is connected with a protection volume 64 by a second choke port 65. Two check valves may open to permit flow from the protection volume 64. One is a spring loaded check valve 66 which permits flow from volume 64 to passage 19. The other is a spring seated check valve 67 which permits flow from the volume 64 to the passage 9. Passage 19 also communicates through a spring seated check valve 68 with the volume 64 and with the space above a flexible diaphragm 69 which is clamped at its margin between the body 58 and the cap 59. The check valve 68 opens in the direction of flow from passage 19 toward chamber 64, whereas the check valve 66 opens in the reverse direction. There is a constantly open free connection from pipe and passage 19 to the space below the diaphragm 69.

The check valve 68 is seated with a light spring load so that charging flow to the protection volume will be rapid, and relatively little differential of pressure upward across diaphragm 69 can be developed during charging. The check valve 67 is also lightly loaded so that protection volume 64 will be vented rapidly to passage 9 during releases of the brake. The effect of rapid venting during releases is to prevent undesired opening of the valve 74. The check valve 66 is rather heavily loaded and serves a purpose which will be hereinafter described.

The diaphragm 69 reacts downward on the thrust plate 71 which is biased upward by coil compression spring 72. Plate 71 reacts downward on a stem 73 which abuts the pilot of a downward-opening check valve 74. The valve 74 controls communication between port 45 and atmospheric exhaust port 61, and is spring-biased in a closing direction, as is clearly shown in the drawing.

Refer to Figure 2. The function of the sander timing valve, shown in this figure, is to supply sanding air to the pipe 25 from the sanding reservoir connected to pipe 27 if either pipe 22 or pipe 22' be put under pressure. One or the other of these pipes will be put under pressure by the rise of the piston 33 in the related operating portion, so that port 44 is exposed and air from the relay pipe 9 is admitted to the pipe 22 (or pipe 22' as the case may be). The double check-valve indicated at 75 will connect whichever of the pipes 22 or 22' is placed under pressure, to the passage 76 and so to the space below diaphragm 77. The diaphragm 77 acts upward on a thrust member 78 which is biased downward by coil compression spring 79. The space above the diaphragm 77 is vented to atmosphere by exhaust passage 81. A bleeder port 80 is arranged between passages 76 and 81 to dissipate the pressure in passage 76 after a reasonable time interval. When the thrust member 78 is forced upward by diaphragm 77, it strikes the pilot of poppet valve 82 and unseats this valve. The effect is to connect passage 83 with atmospheric exhaust port 81.

Formed in the body of the sanding valve is a timing reservoir 84 which is in free communication with passage 83 and with the space above a flexible diaphragm 85. The space below the diaphragm 85 is in free communication with air supply pipe 27. Thus, the space below the diaphragm 85 is always at the pressure existing in the sanding air-supply reservoir. A restricted charging port 86 charges the timing volume 84, the passage 83 and the space above the diaphragm 85 to the same pressure.

If valve 82 is opened, it will vent the space above the diaphragm 85 faster than it can be recharged, so the diaphragm 85 will be forced upward against the resistance of its loading spring 87. The diaphragm 85 carries at its center the usual thrust discs which are connected to a valve 88. When the diaphragm 85 moves upward, it opens the valve 88 and admits sanding reservoir air from the space below the diaphragm to connection 25 and thus supplies air to the sanders 26.

A very brief opening of the valve 82 will serve to vent the timing volume 84. Pressure in volume 84 will be restored slowly, by flow through choke port 86. Until it is restored, valve 88 will remain open and sanding will continue. Thus, the capacity of the timing volume 84 determines the duration of sanding.

*Operation of structure shown in Figs. 1, 2 and 5*

Suppose the engineer makes a brake application by reducing brake pipe pressure. The control valve 6 will function to establish a definite pressure in the pipe 7 and the relay 8 will thereupon function continuously to establish and maintain a related pressure in the pipe 9. This pressure will be communicated through the passage 9, space below piston 33, ports 38, passage and pipe 17 to the brake cylinder 18, causing an application of the brakes. While the brakes are applying, the operating portion and the actuating portion become charged. Air flows to the upper side of piston 33 through passage 41 and ports 42 and 43 at a rate fast enough to prevent upward motion of piston 33. At the same time air flows from passage 9 through port 63 into the passage and pipe 19 and thence through port 65. The effect is to charge the protection volume 64 and the spaces both above and below the diaphragm 69. The space below the diaphragm charges slightly faster.

If the brake application does not produce wheel slipping, brake cylinder pressure will be controlled exclusively by the relay 8 piloted by the control valve 6. However, if slipping occurs to an extent sufficient to operate the decelerometer and vent the pipe 19, the effect will be to reduce pressure below diaphragm 69 at a rapid rate, while the pressure above the diaphragm is maintained by the check valve 68 and the relatively large volume of air trapped in protection volume 64. Depression of the diaphragm opens the valve 74 and vents passage 45 and the connected space above piston 33. Piston 33 then moves full stroke to its uppermost position causing intercepting valve 36 to disconnect pipe 17 from the relay pipe 9 and connect pipe 17 and the brake cylinder freely to atmosphere through ports 38.

Since the piston 33 seals on the gasket 39, there is no way to restore pressure above piston 33 to permit it to return to its lower position until valve 46 can open. Valve 46 cannot open until brake cylinder pressure falls to the chosen value, here assumed to be 6 p. s. i. When that low value is attained, the valve 46 opens and the pressures above and below piston 33 are equalized at a rate controlled by the size of port 51. If immediate restoration is desired, port 51 is made large. If a lag is desired to make sure the brake cylinder is completely vented, the size of port 51 may be appropriately reduced. Port 43 assures equalization of pressures above and below piston 33 once the piston starts its downward movement, thus assuring that full movement will be positive under all conditions.

While the piston 33 is in its uppermost position, the port 44 is exposed to pressure in the relay pipe 9. This pressure is delivered through the pipe 22 (or 22') and double check valve 75 to the space below the diaphragm 77. This immediately starts the sanders into operation for a period measured from the reset of the operating portion, and approximating the time required to recharge volume 84 through port 86.

From the construction described it follows that the brake cylinder is positively disconnected from the relay and vented past intercepting valve 36, sanding cannot be initiated until the venting action of the intercepting valve 36 is assured, and valve 36 cannot close until brake cylinder pressure falls to a safe low value.

The purpose of the check valve 66 is to provide for a condition which might arise if the decelerometer pipe 19 should rupture during a rather heavy brake application.

If the pipe 19 broke at any other time, the effect would be to prevent charging of the protection volume 64, so that the whole anti-slide mechanism would cease to operate and the brakes would apply and release without any interference by the anti-slider. A different situation would arise if the pipe 19 broke while the protection volume 64 was charged. Under such circumstances, if the choke port 65 were the only means by which pressure in the volume 64 could be dissipated, the valve 74 might be held open for a considerable period and so long as it remained open, the brakes could not reapply. With the valve 66 included, failure of the pipe 19 will result in an immediate drop of pressure in the chamber 64 to the value retained by the loading of the valve 66. As a consequence, the valve 74 will close after a relatively short time interval, because the amount of air which must flow through the port 65 is greatly reduced.

*Alternative actuating mechanism in Figure 3*

Figure 3 shows a modified actuator 16a mounted on bracket 13 which is unchanged from the form shown in Figure 1. The operating portion 14 and reset control portion 15 of Figure 1 are used, but are not illustrated. Passages 19, 9, 45, 61 and 62 appear in Figure 3 and extensions of these ports into the actuator 16a are given these numbers.

Passage 9 communicates with passage 19 by restricted port 91 and passage 19 communicates with volume 92 by way of restricted port 93 and a by-pass check valve 94. Volume 92 communicates freely with the space below diaphragm 95 which reacts upward against stem 96 and is biased downward by spring 97. The space bove diaphragm 95 is vented to atmosphere by port 61.

Passage 19 also communicates with the space above diaphragm 98. Passage 45 communicates with the space below this diaphragm. Clamped to the center of diaphragm 98 by plates 99 is a valve 101 which coacts with seat 102 to isolate passage 45 from intermediate space 103. A spring 104 biases valve 101 to close.

A valve 105 with seat 106 is biased closed by spring 107 and when closed isolates space 103 from exhaust passage 61. When diaphragm 95 is forced upward it opens valve 105.

When a brake application is made, passage 45 is charged through the operating portion. The actuating portion is charged through port 91. Valve 101 remains closed but diaphragm 95 holds valve 105 open. Then if the decelerometer vents passage 19 diaphragm 98 will open valve 101, the operating portion shifts and the anti-slider performs its function as already described.

If pipe 19 is ruptured while the brakes are off, volume 92 cannot be charged, valve 105 remains closed and the anti-slider is cut out of action. If pipe 19 is ruptured while the brakes are applied, pressure in 92 will bleed through port 93 so that valve 105 will close after a reasonable interval and condition the device to reset.

*Modification of Figure 4*

Figure 4 shows the same bracket 13 with the same ports, numbered as before. Ports 9 and 19 are blanked by the gasket at the mounting seat.

The actuator 16b comprises a spring loaded poppet valve 111 biased to close by spring 112 and controlling communication between port 45 and exhaust port 61. A solenoid 113 with armature 114 is the means for opening valve 111.

When a decelerometer of the electric type energizes solenoid 113 in response to wheel slippage, armature 114 moves down, opens valve 111 and by venting passage 45 causes the operating portion to function, with results already described.

As indicated in Figure 4, chamber 62 houses a connector 115 for circuit connections to the decelerometer. These replace the pipe 19 which is not used.

*General considerations*

Modifications are possible and two have been described in detail. The control portion can be used without a sander, as will be obvious. The control portion can be operated without an actuating device by merely connecting pipe 19 with passage 45.

Such possibility is illustrated in Fig. 6, where a blanking plate 121 blanks port 9 and has a loop passage 122 which connects passage 19 with passage 45. At the start of an application passage 45 charges from passage 9 via port 42 and will charge pipe 19. If the decelerometer vents pipe 19, it directly vents passage 45 and the space above piston 33.

Actually, all that the actuating device in housing 16 (Fig. 1) or housing 16a (Fig. 3) does, is to afford protection when a decelerometer pipe 19 breaks. If such protection is not desired the actuating device can be omitted.

What is claimed is:

1. In an air brake, the combination of a wheel; a brake cylinder for braking the wheel; a brake controlling valve device of the pressure-maintaining type connected to control pressure in said brake cylinder; an intercepting valve controlling the connection between said valve device and said cylinder and having two alternative positions, a normal position in which it establishes the connection, and an abnormal position in which it interrupts said connection and vents the brake cylinder; yielding means biasing the intercepting valve to said normal position; an operating motor comprising a movable abutment interposed between two working spaces and arranged to shift said intercepting valve; a controlling decelerometer responsive to slipping of said wheel; an actuator activated by response of the controlling decelerometer to wheel-slipping and serving when activated to vent one of said spaces and so cause said motor to shift the intercepting valve to said abnormal position; means controlled by said brake controlling valve device and serving, when the intercepting valve is in normal position, to charge and discharge both said working spaces as air is admitted to and exhausted from the brake cylinder; a recharging valve serving when open to recharge that working space which is vented by the decelerometer, means normally maintaining said valve closed and motor means rendered active by the substantially complete dissipation of brake cylinder pressure to open said valve.

2. The combination defined in claim 1 in which the decelerometer is of a type which momentarily vents a pressure connection in response to wheel-slipping, and the brake controlling valve device charges said connection and discharges it as pressure is admitted to and released from the brake cylinder.

3. The combination defined in claim 1 in which the actuator is of the pneumatic type, and includes a protection volume, the decelerometer is of a type which momentarily vents a pressure connection related to the actuator in response to wheel-slipping, and the brake controlling valve device normally functions to charge and discharge said actuator and said connection as pressure is admitted to and released from said brake cylinder.

4. The combination defined in claim 1 in which the flow capacity of said recharging valve is so limited as to delay recharge for an appreciable time interval.

5. In an air brake the combination of a wheel; a brake cylinder for braking said wheel; a brake controlling valve device of the pressure-maintaining type connected to control pressure in said brake cylinder; an intercepting valve interposed in said connection and having two alternative positions, a normal position in which said connection is open and an abnormal position in which said connection is closed and the brake cylinder is vented; means biasing said intercepting valve to said normal position; an expansible chamber motor having opposed first and second working spaces, said motor being connected to shift with said valve and adapted, when charged, to shift said intercepting valve to abnormal position if its second space is vented, said motor having charging means closed in said abnormal position through which said second space may be charged and discharged by flow through the first space, when the valve is in normal position; connections for charging and discharging said spaces as the brake cylinder is charged and exhausted; a controlling decelerometer driven by said wheel and adapted to respond to slipping thereof when braked to cause the second space in said motor to be vented; and a pressure responsive valve responsive to brake cylinder pressure and arranged to open an independent recharging path to said second space when brake cylinder pressure attains a chosen low value.

6. In an air brake the combination of a wheel; a brake cylinder for braking said wheel; a brake controlling valve device of the pressure-maintaining type connected to control pressure in said brake cylinder; an intercepting valve interposed in said connection and having two alternative positions, a normal position in which said connection is open and an abnormal position in which said connection is closed and the brake cylinder is vented; means biasing said intercepting valve to said normal position; an expansible chamber motor having opposed first and second working spaces, said motor being connected to shift with said valve and adapted, when charged, to shift said intercepting valve to abnormal position if its second space is vented, said motor having charging means closed in said abnormal position through which said second space may be charged and discharged by flow through the first space, when the valve is in normal position; connections for charging and discharging said spaces as the brake cylinder is charged and exhausted; a controlling decelerometer driven by said wheel and adapted to respond to slipping thereof when braked; means activated by such response of said decelerometer and adapted when activated to vent the second space in said motor; and a pressure responsive valve responsive to brake cylinder pressure and arranged to open an independent recharging path to said second space when brake cylinder pressure attains a chosen low value.

7. The combination defined in claim 6, in which the means activated by response of the decelerometer includes a protection volume whose charging during a brake application is a necessary precedent to said brake activation and is dependent on integrity of the decelerometer.

8. The combination defined in claim 6, in which the means activated by response of the decelerometer comprises a pressure responsive secondary valve normally closed to inhibit the venting of said second space, a protection volume to pressure in which the pressure responsive secondary valve responds in an opening direction, and charging means for said volume whose effectiveness depends on integrity of said decelerometer.

WILLIAM F. KLEIN.

REFERENCES CITED

The following references are of record in the file of this patent:

UNITED STATES PATENTS

| Number | Name | Date |
| --- | --- | --- |
| 2,198,022 | Aikman | Apr. 23, 1940 |
| 2,198,031 | Farmer | Apr. 23, 1940 |
| 2,366,044 | McCune | Dec. 26, 1944 |